(12) United States Patent
Barrett

(10) Patent No.: US 9,233,655 B2
(45) Date of Patent: Jan. 12, 2016

(54) CLOUD-BASED VEHICLE INFORMATION AND CONTROL SYSTEM

(71) Applicant: CloudCar, Inc., Mountain View, CA (US)

(72) Inventor: Peter Barrett, Palo Alto, CA (US)

(73) Assignee: CloudCar, Inc., Mountain View, CA (US)

( * ) Notice: Subject to any disclaimer, the term of this patent is extended or adjusted under 35 U.S.C. 154(b) by 0 days.

(21) Appl. No.: 14/708,221

(22) Filed: May 9, 2015

(65) Prior Publication Data

US 2015/0239408 A1 Aug. 27, 2015

Related U.S. Application Data

(63) Continuation of application No. 13/671,455, filed on Nov. 7, 2012, now Pat. No. 9,031,710.

(51) Int. Cl.
*B60R 16/023* (2006.01)
*G07C 5/00* (2006.01)
*H04W 4/04* (2009.01)
*H04L 29/12* (2006.01)

(52) U.S. Cl.
CPC .............. *B60R 16/023* (2013.01); *G07C 5/00* (2013.01); *H04W 4/046* (2013.01); *G07C 5/008* (2013.01); *H04L 61/00* (2013.01)

(58) Field of Classification Search
CPC ....... B60R 16/023; G06F 17/00; H04W 4/046
USPC ........................................................... 701/1
See application file for complete search history.

(56) References Cited

U.S. PATENT DOCUMENTS

| | | | |
|---|---|---|---|
| 7,966,111 B2 | 6/2011 | Moinzadeh |
| 8,046,501 B2 | 10/2011 | Gormley |
| 8,050,817 B2 | 11/2011 | Moinzadeh |
| 9,031,710 B2 | 5/2015 | Barrett |
| 2010/0010706 A1 | 1/2010 | Gormley |
| 2010/0037057 A1 | 2/2010 | Shim |
| 2010/0097239 A1 | 4/2010 | Campbell et al. |
| 2012/0100806 A1 | 4/2012 | Hall |
| 2012/0252405 A1 | 10/2012 | Lortz |
| 2013/0138714 A1 | 5/2013 | Ricci |

OTHER PUBLICATIONS

Georg zur Bonsen, Daniel Ammann, Michael Ammann, Etienne Favey, and Pascal Flammant, "Combining GPS with Sensor-Based Dead Reckoning", GPS World, Apr. 1, 2005.

*Primary Examiner* — Mary Cheung
*Assistant Examiner* — Anne Mazzara
(74) *Attorney, Agent, or Firm* — Inventive Patent Law P.C.; Jim H. Salter

(57) ABSTRACT

Systems and methods for providing a cloud-based vehicle information and control ecosystem are disclosed. A particular embodiment includes: providing a first layer of a cloud-based vehicle information and control ecosystem, the first layer being in data communication with at least one network resource via a network cloud; providing a second layer of the cloud-based vehicle information and control ecosystem in data communication with the first layer, the second layer being in data communication with at least one mobile device; providing a third layer of the cloud-based vehicle information and control ecosystem in data communication with the second layer, the third layer including a subsystem for linking the third layer to at least one electronic control unit (ECU) of a vehicle; and causing, by use of a data processor, data indicative of a state change occurring in the at least one ECU to be communicated to a component in the first layer.

20 Claims, 8 Drawing Sheets

| steeringColumn | hvac | instrumentPanel | tires |
| --- | --- | --- | --- |
|   dPad |   temperatureTarget |   speed |   rotation |
|   volumeJog |   temperatureIndicator |   rpm |   pressure |
|   tuneJog |   airflow |   odometer |   angle |
|   call |   aircon |   power |   temperature |
|   hangup | seats |   torque | proximity |
|   wheelAngle |   occupant |   engineTemperature |   frontLeft |
|   turnIndicators |   seatbelts |   fuelConsumption |   frontCenter |
|   headlights |   adjust |   batteryVoltage |   frontRear |
|   wipers |   heater |   transmissionStatus |   backLeft |
|   cruiseControl | doors |   chargeRate |   backCenter |
|   horn |   status |   dischargeRate |   backRear |
| console |   handle |   range |   sideLeft |
|   dPad |   windowPosition |   hybrid |   sideRight |
|   volumeJog |   sunroof |   regen | laneAssist |
|   tuneJog | ignition |   batteryTemperature |   leftAlign |
|   call |   fobProximity |   fuelLevel |   rightAlign |
|   hangup |   acceleratorPosition |   coolantLevel | exterior |
|   touchscreen |   brakePedalPosition |   wiperFluidLevel |   temperature |
|   touchpad |   transmissionPosition |   secondaryDisplay |   rainSensor |
|   linearJog |   parkingBrakePosition | gps |   draftPressure |
|   presets | |   latitude | mems |
|   secondaryDisplay | |   longitude |   accelerometer |
| audio | |   altitude |   compass |
|   source | |   fixQuality |   gyroscope |
|   volume | | | obd |
| radio | | |   mode1 |
|   presets | | |   ... |
|   frequency | | |   modeA |
|   seek | | | |
|   signal | | | |
|   rds | | | |

```
class CCRadio
{
    class FrequencyRangeProperties
    {
        int minFrequency;
        int maxFrequency;
        int interval;
    };

class PresetProperties
    {
        int range;
        int frequency;
        int mode;
        string name;
    };

bool hasFrequencyRange(int range);
    FrequencyRangeProperties getFrequencyRangeProperties(int range);

int getFrequencyRange();
    void setFrequencyRange(int range);

int getFrequency();
    void setFrequency(int frequency);

bool getSquelch();
    void setSquelch(bool squelch);

int getStereoMode();
    void setStereoMode(int mode);

int getSignalStrength();
    int getPresetCount();

PresetProperties getPresetProperties(int index);
    void setPresetProperties(int index, PresetProperties preset);

void seek(bool up);
    void stopSeeking();
}
```

CLOUD-BASED VEHICLE INFORMATION AND CONTROL SYSTEM

PRIORITY PATENT APPLICATION

This continuation patent application claims priority to co-pending U.S. non-provisional patent application Ser. No. 13/671,455; filed on Nov. 7, 2012. The entire disclosure of the referenced patent application is considered part of the disclosure of the present application and is hereby incorporated by reference herein in its entirety.

TECHNICAL FIELD

This patent document pertains generally to tools (systems, apparatuses, methodologies, computer program products, etc.) for allowing electronic devices to share information with each other, and more particularly, but not by way of limitation, to a cloud-based vehicle information and control system.

BACKGROUND

An increasing number of vehicles are being equipped with one or more independent computer and electronic processing systems. Certain of the processing systems are provided for vehicle operation or efficiency. For example, many vehicles are now equipped with computer systems for controlling engine parameters, brake systems, tire pressure and other vehicle operating characteristics. A diagnostic system may also be provided that collects and stores information regarding the performance of the vehicle's engine, transmission, fuel system and other components. The diagnostic system can typically be connected to an external computer to download or monitor the diagnostic information to aid a mechanic during servicing of the vehicle.

Additionally, other processing systems may be provided for vehicle driver or passenger comfort and/or convenience. For example, vehicles commonly include navigation and global positioning systems and services, which provide travel directions and emergency roadside assistance. Vehicles are also provided with multimedia entertainment systems that include sound systems, e.g., satellite radio, broadcast radio, compact disk and MP3 players and video players. Still further, vehicles may include cabin climate control, electronic seat and mirror repositioning and other operator comfort features.

However, each of the above processing systems is independent, non-integrated and incompatible. That is, such processing systems provide their own sensors, input and output devices, power supply connections and processing logic. Moreover, such processing systems may include sophisticated and expensive processing components, such as application specific integrated circuit (ASIC) chips or other proprietary hardware and/or software logic that is incompatible with other processing systems in the vehicle.

Moreover, these processing systems in vehicles have failed to exploit the advantages of wide-area data networking. Although some vehicles support the use and integration of mobile phones in some vehicle subsystems for voice communications, conventional vehicle systems do not support the integration of wide-area data networking or the use of information obtained from or sent to network resources.

BRIEF DESCRIPTION OF THE DRAWINGS

The various embodiments is illustrated by way of example, and not by way of limitation, in the figures of the accompanying drawings in which:

FIG. 4 illustrates an example of a set of events that can be exposed to the automotive data abstraction and communication system device according to some embodiments;

FIG. 6 illustrates an example of the data structures and methods or procedures used to service various events mapped from vehicle state change information passed to the subsystems of the cloud-based vehicle information and control ecosystem;

DETAILED DESCRIPTION

Figure 1:
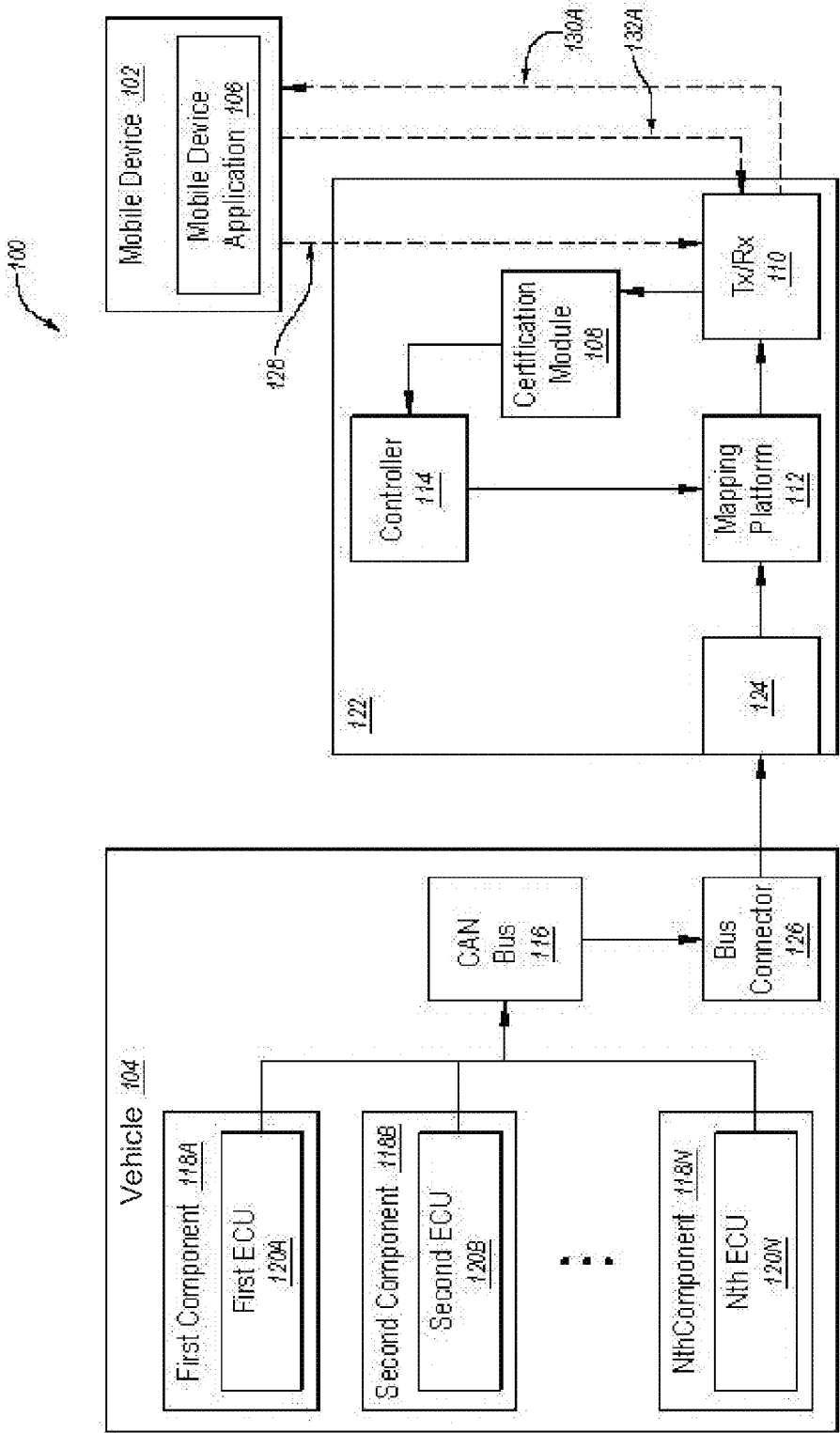
FIG. 1 illustrates a block diagram of an example vehicle data abstraction and communication system in which embodiments described herein may be implemented.

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, systems and methods for providing a cloud-based vehicle information and control ecosystem are described herein. In one particular embodiment, the cloud-based vehicle information and control ecosystem can be configured like the ecosystem illustrated in FIG. 2. However, it will be apparent to those of ordinary skill in the art that the cloud-based vehicle information and control ecosystem described and claimed herein can be implemented, configured, and used in a variety of other applications and systems.

Particular example embodiments relate to the communication of signals and information and the activation of procedures and/or services between network resources, mobile devices, and Controller Area Network (CAN) buses in a vehicle. Embodiments disclosed herein generally enable the communication of signals between electronic control units (ECUs) of a vehicle, a controller platform, network-based mobile devices, such as mobile phones or mobile computing platforms, and network resources, such as server computers. Data signals communicated from the ECUs to the mobile devices or network resources may include information about the state of one or more of the components of the vehicle. In particular, in some embodiments the data signals, which are communicated from the ECUs to the CAN bus, are abstracted by an automotive data abstraction and communication device (abstraction device). The abstraction device connects directly to an On Board Diagnostics (OBD) connector that enables access to the CAN bus. The abstraction device converts the data signals from a vehicle-specific format to a mobile device format defined by an Application Programming Interface (API). The abstraction device then wirelessly and securely transmits the data signals to the mobile device and/or a network resource. By converting the data signals to the mobile device format, the mobile device may use the data signals without knowing the vehicle-specific format. Additionally, the mobile device format defined by the API exposes the data signals, ECUs and other vehicle hardware and software in a standardized way, thereby enabling multiple vendors or software developers to create mobile device applications that process the data signals. In the same way, the API can expose the data signals, ECUs and other vehicle hardware and software in a standardized way for the network resources.

Additionally, a user of the mobile device and/or a network resource can send a write or control signal from the mobile device and/or network resource through the abstraction device to the CAN bus. The write/control signal enables the user of the mobile device and/or network resource to alter the state of one or more components included in the vehicle. The write signal is formatted in the mobile device format defined by the API and wirelessly transmitted to the abstraction device. The abstraction device converts the write/control signal to the vehicle-specific format and communicates the write signal to the vehicle. By converting the write signal from the mobile device format defined by the API to the vehicle-specific format, the abstraction device may interface with multiple vehicles. Additionally, the mobile device format defined by the API acts as a common programming language enabling multiple vendors to write mobile device and/or network resource applications that may communicate read and write signals to multiple types of vehicles independent of the model or manufacturer.

Additionally, the abstraction device can include a certification module, which controls access to some data signals and limits access to one or more components of the vehicle through verification of a user, a mobile device application, a mobile device, a network resource, a network resource application, software on the head unit or other device, or some combination thereof. By including the certification module, the system controls access to sensitive portions of the CAN bus, such as airbags, brakes, or Global Positioning System (GPS) location. This assures that a virus, a rogue application, or misuse by a user cannot damage the vehicle or injure the occupants, while allowing an approved application access to any required data or device. Additionally, the certification module allows the manufacturer to control dissemination of proprietary signals. Additional embodiments are described with reference to the appended drawings.

The certification module can be configured to grant various levels of access to the CAN bus and associated CAN messages based on a level of authorization associated with the application or device that requests such access. For example, a fully certified mobile device or a mobile device having a fully certified app (referred to herein as "OEM certified") can be assigned a full authentication level and granted access to native, raw data signals on the CAN bus. In this way, equipment used by manufacturers, authorized service technicians, etc., can be given direct access to raw CAN messages, without abstraction by an API. In this way, only OEM certified devices can obtain access to the raw CAN messages, thereby giving vehicle manufacturers the ability to restrict access to raw CAN messages by devices that are not granted full certification. In contrast, in the absence of the embodiments described herein, there has been no certification in many vehicles regarding the devices that can be given direct access to raw CAN messages, which has presented significant security and safety issues.

Moreover, the certification module can be configured to grant more restrictive access to the CAN bus to mobile devices that do not qualify for OEM certification. For example, a mobile device and/or a network resource that is authenticated by the certification module at a more restrictive authentication level, can be given access to higher-level events mapped from the CAN messages, as opposed to being given direct access to raw CAN messages. The authentication level might give only read access, or read access combined with write access for only certain events (i.e., those that do not pose a safety hazard).

As used herein, the term "CAN bus," refers to any bus used in a vehicle for communicating signals between ECUs or components. The CAN bus may be a bus that operates according to versions of the CAN specification, but is not limited thereto. The term "CAN bus" can therefore refer to buses that operate according to other specifications, including those that might be developed in the future.

As used herein and unless specified otherwise, the term "mobile device" extends to any device that can communicate with the abstraction devices described herein to obtain read or write access to messages or data signals communicated on a CAN bus or via any other mode of inter-process data communications. In many cases, the mobile device is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device can be a computing device, personal computer (PC), multiprocessor system, microprocessor-based or programmable consumer electronic device, network PC, diagnostics equipment, a system operated by a vehicle manufacturer or service technician, and the like, and is not limited to portable devices. The mobile device can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" extends to any device, system, or service that can communicate with the abstraction devices described herein to obtain read or write access to messages or data signals communicated on a CAN bus or via any other mode of inter-process or networked data communications. In many cases, the network resource is a data network accessible computing platform, including client or server computers, websites, mobile devices, peer-to-peer (P2P) network nodes, and the like. Additionally, the network resource can be a web appliance, a network router, switch, bridge, gateway, diagnostics equipment, a system operated by a vehicle manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resource may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The data network (also denoted the network cloud) used with the network resources can be configured to couple one computing or communication device with another computing or communication device. The network may be enabled to employ any form of computer readable data or media for communicating information from one electronic device to another. The network can include the Internet in addition to other wide area networks (WANs), metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (IS-DNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly.

The network may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices, with various degrees of mobility. For example, the network may enable a radio connection through a radio network access, such as Global System for Mobile communication (GSM), General Packet Radio Services (GPRS), Enhanced Data GSM Environment (EDGE), Wideband Code Division Multiple Access (WCDMA), CDMA2000, and the like. The network may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, the network may include virtually any wired and/or wireless communication mechanisms by which information may travel between one computing device and another computing device, network, and the like.

In a particular embodiment, a platform system and/or a mobile device with may act as a client device enabling a user to access and use the cloud-based vehicle information and control system via the network. These client devices may include virtually any computing device that is configured to send and receive information over a network, such as network ecosystem as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

FIG. 1 illustrates a block diagram of an example vehicle data abstraction and communication system 100 in which components of the embodiments described herein may be implemented. FIG. 1 depicts an example of an operating environment for the vehicle data abstraction and communication systems described herein. FIG. 1 also illustrates an example embodiment in which a mobile device 102 is identified as having an authentication level that permits the mobile device 102 to have access to higher-level events mapped from CAN messages, as opposed to being given direct access to raw CAN messages.

In FIG. 1, the system 100 includes a vehicle 104, an abstraction device 122, and a mobile device 102. Generally, FIG. 1 depicts the communication of data signals from the vehicle 104 to the abstraction device 122 and to the mobile device 102. Some of the data signals can be produced at the vehicle 104, the format of the data signals are converted at the abstraction device 122, and the data signals are processed at the mobile device 102.

FIG. 1 depicts a system 100 that includes the vehicle 104. The systems and methods described herein can be used with substantially any mechanized system that uses a CAN bus as defined herein, including, but not limited to, industrial equipment, boats, trucks, or automobiles; thus, the term "vehicle" extends to any such mechanized systems. The systems and methods described herein can also be adapted for use with other devices that have accessible data, such as medical equipment. The systems and methods described herein can also be used with any systems employing some form of network data communications.

In a particular embodiment related to a cloud-based vehicle information and control ecosystem, vehicle 104 may include multiple automotive components 118A-118N (generally, a component 118 or components 118). The components 118 include the individual apparatuses, systems, subsystems, mechanisms, etc. that are included in the vehicle 104. The components 118 may include, but are not limited to, windows, door locks, oxygen sensors, an ignition system, windshield wipers, brakes, engines, GPS and navigation systems, a tachometer, etc.

The vehicle 104 may additionally include one or more electronic control units 120A-120N (an ECU 120 or ECUs 120). The ECUs 120 are associated with the components 118. As used with respect to the relationship between the ECUs 120 and the components 118, the term "associated with" may refer to the component 118 including an ECU 120, the component 118 being coupled to and ECU 120 for monitoring a state of the component 118, the ECU 120 controlling the component 118, or some combination thereof. As illustrated in FIG. 1, one ECU 120 is associated with one component 118. However, this depiction is not meant to be limiting. In some embodiments, one ECU 120 may be associated with multiple components 118. Additionally or alternatively, multiple ECUs 120 may be associated with a single component 118. Additionally or alternatively, some embodiments include ECUs 120 associated with some subset of ECUs 120, etc.

In FIG. 1, a first component 118A is associated with a first ECU 120A, a second component 118B is associated with a second ECU 120B, and an Nth component 118N is associated with an Nth ECU 120N. The inclusion of the Nth component 118N, the Nth ECU 120N, and the ellipses is meant to indicate that the number of components 118 and/or ECUs 120 are not limited. That is, the vehicle 104 may include hundreds or thousands of components 118 and/or ECUs 120, for instance.

In the particular embodiment shown in FIG. 1, the first ECU 120A associated with the first component 118 may monitor the first component 118. The ECU 120A may communicate a state or a condition of the first component as a data signal to the CAN bus 116. For example, if the first component 118A was the steering wheel, the first ECU 120A may communicate the radial position of the steering wheel in real time to the CAN bus 116. Similarly, the second ECU 120B and the Nth ECU 120N may communicate the data signals to the CAN bus 116 regarding the state or the condition of the second component 118B and the Nth component 120N, respectively. Accordingly, the data signals may include, but are not limited to, positions of the windows, positions of the door locks, oxygen levels measured in the oxygen sensors, ignition timing, state of the windshield wipers, a position of the steering wheel, RPM of the engine, and the like.

The data signals may be formatted in a vehicle-specific format—i.e., specific to a vehicle make and model. The vehicle-specific format generally refers to the format of the data signals for the vehicle 104. That is, the vehicle 104 may be manufactured by a first manufacturer that may have a vehicle-specific format for all its vehicles. Alternatively, the first manufacturer may have a vehicle-specific format for different models, years, option packages, etc. Generally, the vehicle-specific formats of different vehicles 104 are not the same. Thus, a vehicle manufactured by the first manufacturer typically has a different vehicle-specific format that a second vehicle manufactured by a second manufacture. Additionally or alternatively, in some embodiments, the data signals may be differential signals.

The CAN bus 116 receives the data signals from the ECUs 120. Additionally, the CAN bus 116 may enable the components 118 or some subset thereof to internally communicate without an additional computer system. Thus, data signals received at the CAN bus 116 may be available for download, may be internally communicated within the vehicle 104, or may be dropped.

In some embodiments, the CAN bus 116 may be coupled to a bus connector 126 that enables access to the CAN bus 116. For example, in this and other embodiments, the vehicle 104 may include an On Board Diagnostics (OBD) connector. The bus connector may be configured according to an OBD II specification, for instance. In embodiments with multiple CAN buses 116, the vehicle 104 may include multiple bus connectors 126 and/or alternative bus connectors that enable access to one or more CAN buses 116. In most modern vehicles, the CAN bus 116 includes the bus connector 126 located under the hood or accessible through the removal of a panel in the cabin of the vehicle 104. However, embodiments described herein can be implemented by using connector 124 that connects with CAN bus 116 in any available way.

The data signals or some subset thereof may be communicated to the abstraction device 122. In some embodiments, the abstraction device 122 is a discrete unit that can be adapted for use with one or more existing or new vehicles 104. For example, as explained herein, the abstraction device 122 can be embodied in a discrete unit that can be installed in an existing or new vehicle 104 by connecting it to the bus connector 126 (e.g., an OBD II connector) associated with CAN bus 116. In this way, the methods and systems described herein can be easily used with substantially any new or existing vehicle 104 that includes a CAN bus 116.

In other embodiments, the abstraction device 122 or elements thereof may be integrated into new vehicles or retrofitted into an existing vehicle. Under this approach, the elements of the abstraction device 122 are a substantially permanent system of vehicle 104. In this case, abstraction device 122 can replace or supplement the bus connector 126 that may otherwise be present in the vehicle 104. In these embodiments, the abstraction device 122 may be a platform within a larger apparatus or system or may be an integrated circuit with controllers and/or microcontrollers that manage or dictate the function of the abstraction device 122.

The abstraction device 122 couples with the bus connector 126 associated with the CAN bus 116 via a connector 124. For example, the CAN bus 116 may have a bus connector 126 (e.g., an OBD II connector) that is adapted to connect with the connector 124 or the abstraction device 122 may include the connector adapted to interface with the bus connector 126. Generally, the interface between the connector 124 and the bus connector 126 includes a physical connection as well as an electrical interface such that the data signals communicated to the CAN bus 116 may be further communicated to the abstraction device 122.

When connected to the CAN bus 116, the connector 124 may communicate the data signals to mapping platform 112. Generally, the mapping platform 112 may be configured to convert a data signal from the vehicle-specific format into a mobile device format and/or a network resource format defined by an Application Programming Interface (API). Additionally, in some embodiments, the API included in the mapping platform 112 may enable the conversion of data signals from multiple vehicle-specific formats to the mobile device format and/or a network resource format. Thus, the mapping platform 112 may not be specific to the vehicle 104. Some additional details of the mapping platform 112 and the API are discussed with reference to FIG. 3.

Alternatively, in some embodiments, the abstraction device 122 may include one or more controllers 114 that may be configured to receive one or more data signals from the CAN bus 116. The controller 114 may then communicate the data signals to the mapping platform 112.

In the example embodiment of FIG. 1, the abstraction device 122 includes a certification module 108 configured to limit access to the data signal converted to the mobile device format by the mapping platform 112. In the example of FIG. 1, the certification module 108 determines that mobile device 102 is authenticated at a level that permits the mobile device 102 to access events mapped from the CAN messages by the mapping platform 112 rather than accessing the native, raw CAN messages. For instance, mobile device 102 can be a device operated by a driver or passenger of the vehicle, with a mobile device application 106 that is configured to detect, respond to, or initiate events mapped from the CAN messages by the mapping platform 112. The events can be limited to those that have been determined to be appropriate for the authentication level of the mobile device 102. In this way, mobile device 102, in this example, is prevented from having full access to the raw CAN messages, thereby substantially limiting the ability of mobile device 102 to perform action that might damage the vehicle 104 or put the passengers in danger.

In this and other embodiments, the certification module 108 may function through communication with a transceiver 110 and a controller 114. The transceiver 110 ("Tx/Rx" in FIG. 1) may receive an identification signal from the mobile device 102 and/or a mobile device application 106 on the mobile device 102. The communication of the identification signal is indicated by the arrow 128 in FIG. 1. The identification signal 128 may include one or more privileges possessed by the mobile device 102 and/or the mobile device application 106. For example, the mobile device 102 may be owned or operated by a mechanic who may have a specific privilege without authentication of the specific mobile device application 106 or the specific mobile device application 106 may include a privilege. Some examples of privileges may include one or more read privileges and/or one or more write privileges. The identification signal 128 may be communicated from the transceiver 110 to the certification module 108. The certification module 108 may verify or authenticate whether the mobile device 102 and/or the mobile device application 106 includes a specific privilege.

The certification module 108 may communicate whether the mobile device 102 and/or the mobile device application 106 has an authentication level that permits access to events mapped by mapping module 112 or direct access to raw CAN messages. In this example, in which mobile device 102 has an authentication level that permits access to events, the certification module communicates whether the authentication level grants the mobile device 102 specific privilege to the controller 114. If the mobile device 102 and/or the mobile device application 106 do not include the specific privilege, then the controller 114 may prohibit conversion of data signals and/or transmission of the data signals from the transceiver 110 to the mobile device 102. If however, the mobile device 102 and/or the mobile device application 106 do include the specific privilege, the controller 114 may allow the mapping platform 112 to perform a conversion and/or the transmission of the data signals to the mobile device 102 by the transceiver 110. The certification module 108 may therefore restrict the transmission of the data signal through authentication of privileges assigned to the mobile device 102 or the mobile device application 106.

In some embodiments, the certification module 108 may be able to authenticate or verify multiple read privileges. Different read privileges may correspond to different subsets of the data signals that may be converted by the mapping platform 112 and/or transmitted to the mobile device 102. For example, the read privileges may include a first read privilege that prevents the transmission of a first subset of data signals and a second read privilege that may allow the transmission of the first subset of data signals.

Abstraction device 122 can be implemented using systems that enhance the security of the execution environment, thereby improving security and reducing the possibility that the abstraction device 122 and the related services could be compromised by viruses or malware. For example, abstraction device 122 can be implemented using a Trusted Execution Environment, which can ensure that sensitive data is stored, processed, and communicated in a secure way.

As stated above, the transceiver 110 may receive data signals that have been converted to the mobile device format and/or a network resource format defined by the API. The transceiver 110 may then communicate the data signals formatted in the mobile device format to the mobile device 102. In FIG. 1, the communication of the data signal to the mobile device 102 is represented by arrow 130A. More specifically, in this and other embodiments, the transceiver 110 may be configured to wirelessly communicate the data signal in the mobile device format to the mobile device 102. The transceiver 110 may include several configurations. In this and other embodiments, the transceiver 110 may include: a wireless receiver to receive identification signals and/or write signals from the mobile device 102; another receiver to receive the data signals from the mapping platform 112; a wireless transmitter to communicate the data signals in the API to the mobile device 102; and another transmitter that communicates identification signals to the communication module 108 and/or write signals to the mapping platform 112. In some embodiments, the transceiver 110 includes a Bluetooth transceiver.

Additionally in some embodiments, the transceiver 110 may establish a secure channel between the abstraction device 122 and the mobile device 102. In addition to or alternative to the secure channel, the abstraction device 122 may encrypt the data signals formatted in the mobile device format. The mobile device 102 may decrypt the data signals. The inclusion of the secure channel and/or encryption may enhance security of the data signals communicated to the mobile device 102.

The mobile device 102 receives the data signals communicated from the abstraction device 122. In embodiments in which the transceiver 110 wirelessly communicates the data signals to the mobile device 102, the mobile device 102 can include wireless capabilities such as Bluetooth, Wi-Fi, 3G, 4G, LTE, etc. For example, if the transceiver 110 includes a Bluetooth transceiver, the mobile device 102 includes Bluetooth capabilities. Generally, the mobile device 102 includes one or more mobile device applications 106 that process the data signals. The mobile device application 106 may be loaded, downloaded, or installed on the mobile device 102. Alternatively, the mobile device 102 may access the mobile device application 106 via a network cloud or internet browser, for example. The mobile device application 106 may also be accessed and used as a Software as a Service (SaaS) application. The mobile device application 106 may be written or created to process data signals in the mobile device format rather than the vehicle-specific format. Accordingly, the mobile device application 106 may be vehicle-agnostic. That is, the mobile device application 106 may process data signals from any vehicle 104 once the data signals formatted in the vehicle-specific format are converted by the mapping platform 112.

In some embodiments, the mobile device application 106 includes an ability to perform an API call. The API call is represented in FIG. 1 by arrow 132A. The API call 132A may be an integrated portion of the mobile device application 106 and may allow a user of the mobile device 102 to request data signals from the vehicle 104. The API call 132A may be communicated to the transceiver 110, which then relays the content of the API call 132A through the mapping platform 112, which converts the requested data signals to the mobile device format. The requested data signals are transmitted to the mobile device 102. In other embodiments, a remote procedure call (RPC) can be used to request data or invoke a function using an inter-process communication that allows a mobile device application 106, for example, to cause a subprocess or procedure to execute in a vehicle component 118 or the abstraction device 122.

By processing the data signals, the mobile device application 106 may function better than a mobile device application without the data signals or may be able to provide functionality not possible without the data signals. For example, the mobile device applications 106 may include a navigation application. The navigation application may receive GPS signals as well as data signals related to a radial position of the steering wheel, an angle of the tires, a speed, etc. of the vehicle 104. The navigation application may process the GPS signals as well as the data signals from the vehicle 104. Thus, the navigation application may output more accurate navigation data than another navigation application that only processes GPS signals.

Additionally or alternatively, the mobile device application 106 may enable abstraction of data signals for aggregate uses. For some aggregate uses, the mobile device application 106 may sync with one or more secondary systems (not shown). For example, the mobile device 102 may abstract data signals related to states of the windshield wipers. The mobile device 102 may communicate with a secondary system that determines weather patterns based on the state of windshield wipers in multiple vehicles in a given location at a given time.

Examples of the mobile device applications 106 are not limited to the above examples. The mobile device application 106 may include any application that processes, abstracts, or evaluates data signals from the vehicle 104 or transmits write/ control signals to the vehicle 104.

Figure 2:
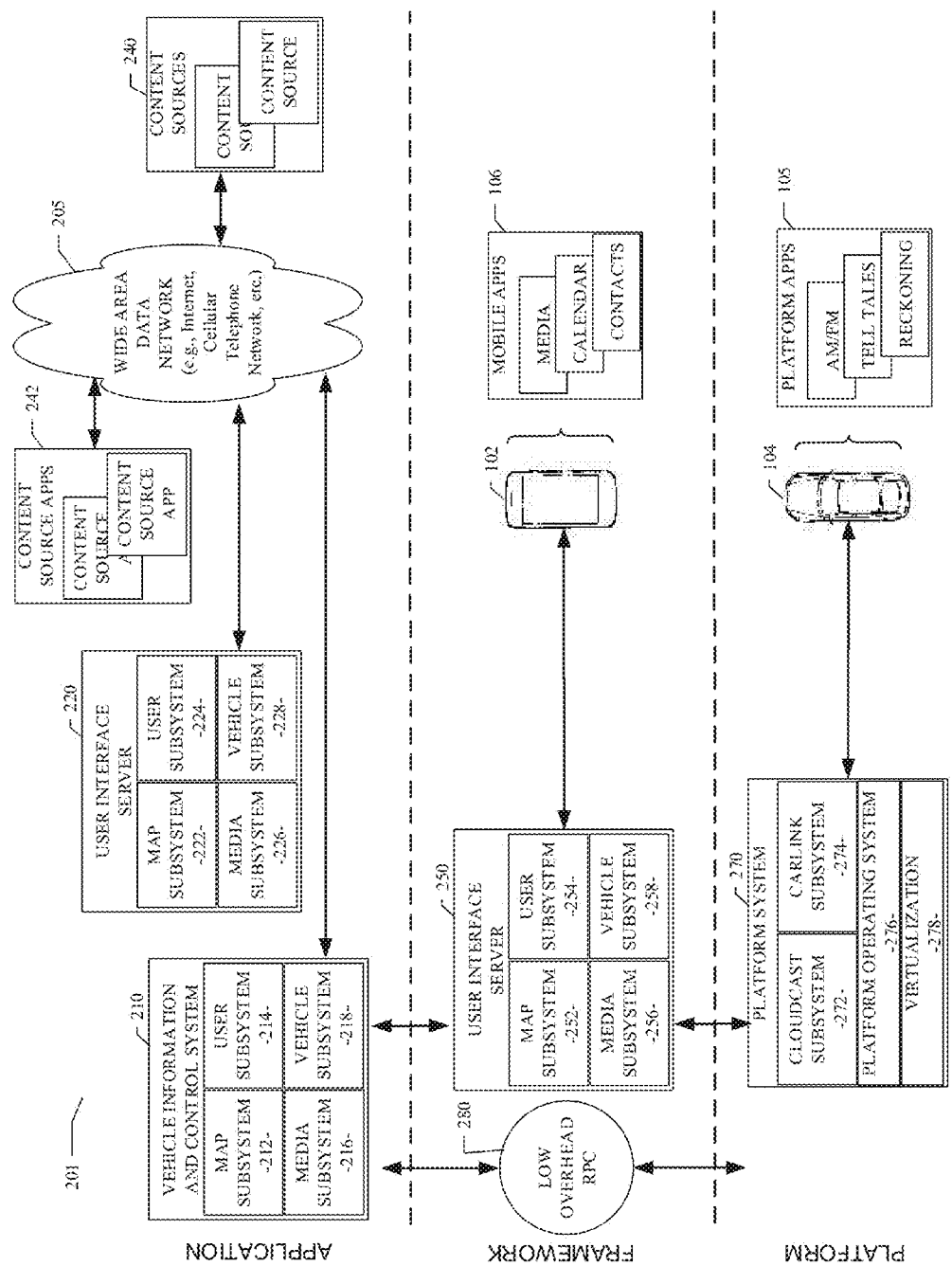
FIG. 2 illustrates an example embodiment of a cloud-based vehicle information and control ecosystem.

Referring now to FIG. 2, a cloud-based vehicle information and control ecosystem 201 is illustrated. In an example embodiment, the communication path between a mobile device and the subsystems of a vehicle as described above can be expanded into a cloud-based vehicle information and control ecosystem that brings the full power of the Web to bear on enhancing the driving experience. In the particular example embodiment shown in FIG. 2, the ecosystem 201 can be partitioned into three layers: an application layer (first layer), a framework layer (second layer), and a platform layer (third layer). The application layer represents the most abstract and broad level of the vehicle information and control system. The application layer can include a vehicle information and control system 210, which can provide several subsystems including a map or geo-location-based support subsystem 212, a user or people/communication-based support subsystem 214, a media (e.g., audio or video) support subsystem 216, and a vehicle subsystem 218. These subsystems provide support for a variety of vehicle, driver, passenger, and $3^{rd}$ party applications, such as geo-navigation, in-vehicle control of media, hands-free communication, monitoring and control of various vehicle systems and components, convergence of social communities with vehicle operation, mining of vehicle and/or driving related data from a single vehicle or thousands of vehicles. The application layer can be in data communication with content sources 240 via the network cloud 205 directly or via one or more apps (software application modules) 242 configured to process and serve data and services from a particular content source 240. The network cloud 205 represents one or more of the various types of data networks described above, such as the Internet, cellular telephone networks, or other conventional data networks and related network protocols. The content sources 240 represent a type of the network resources (e.g., server computers, websites, etc.) described above. In an example embodiment, the application layer is configured to provide information access and control to users from a variety of user devices via local or remote data communications.

Additionally, the application layer can provide a user interface server 220 to support human interaction with the various applications of the application layer. In a particular embodiment, the user interface server 220 can include: a map or geo-location-based support subsystem interface 222, a user or people/communication-based support subsystem interface 224, a media (e.g., audio or video) support subsystem interface 226, and a vehicle subsystem interface 228. The user interface server 220 can be in data communication with the vehicle information and control system 210 via the network cloud 205. The user interface server 220 can also be in data communication with content sources 240 via the network cloud 205.

In an example embodiment, the map or geo-location-based support subsystem 212 and its related interface 222 provides information and services to support in-vehicle navigation, mapping, routing, location searching, proximity alerting, and a variety of functions related to geo-location. One of the components 118 of the vehicle 104 can include a global positioning system (GPS) device that can produce a geo-coordinate position of the vehicle 104 at any point in time. Alternatively or in addition, a GPS device can be available in a mobile device that is accessible to one of the components 118 of the vehicle 104. The data from these one or more GPS devices is accessible to the geo-location-based support subsystem 212 using the data transfer mechanisms described above. The geo-location-based support subsystem 212 can use this geo-coordinate position of the vehicle 104 to correlate the locations of points of interest in proximity to the location of the vehicle. The locations of these points of interest can be obtained from a locally maintained database or from any of the network resources accessible via the network cloud 205. The geo-location-based support subsystem interface 222 can present these points of interest to an occupant of the vehicle 104 using the data transfer mechanisms described above. The occupant of the vehicle can select one or more points of interest and the geo-location-based support subsystem 212 can generate mapping, navigation, and routing information related to the selected points of interest. The geo-location-based support subsystem interface 222 can also generate alerts to notify the vehicle occupant of the proximity of a point of interest.

In an example embodiment, the user or people/communication-based support subsystem 214 and its related interface 224 provides information and services to support interactions and communications between people. These interactions and communications can include in-vehicle wireless telephone communications, messaging, texting, social network updates (e.g., Facebook, Twitter, etc.), contact list management, conferencing, and the like. The user or people/communication-based support subsystem 214 can also coordinate with the geo-location-based support subsystem 212 to correlate the geo-locations of people of interest and generate corresponding alerts. The people of interest can be determined or user-specified based on contact lists, social network profiles, network resource searches, and the like.

In an example embodiment, the media (e.g., audio or video) support subsystem 216 and its related interface 226 provides information and services to support the search, selection, purchase, and playing of audio, video, or other media selections in the vehicle. One of the components 118 of the vehicle 104 can include a media player, which can receive content for playback from a traditional antennae source, an optical disc source (e.g., compact disc—CD), magnetic tape, or the like. Additionally, the media player can include a dock or physical interface for receiving a portable MP3 player, cellular telephone, or other mobile device. The media player can be configured to play or record media content from these mobile devices. Moreover, the media player can include an interface for search, selection, purchase, and playing of audio, video, or other media selections from a network resource. In this manner, any media content available in the network cloud 205 can be streamed or downloaded to a media player and played or recorded in the vehicle.

In an example embodiment, the vehicle subsystem 218 and its related interface 228 provides information and services to support the monitoring, configuration, and control of vehicle subsystems. As described above, the components 118 of the vehicle 104 can include a variety of vehicle subsystems and related ECUs. The status of these vehicle subsystems can be communicated through the abstraction layers shown in FIG. 2 as described above. The vehicle subsystem 218 can receive these vehicle subsystem status signals and process these signals in a variety of ways. Similarly, vehicle control signals generated by the vehicle subsystem 218 and its related interface 228 can be communicated through the abstraction layers shown in FIG. 2 as described above. These control signals can be used by one or more components 118 of the vehicle 104 to configure and control the operation of the one or more components 118.

Referring still to FIG. 2, the framework layer represents a set of interfaces and control subsystems supporting the application layer and platform layer to which the framework layer is connected. The framework layer provides a lower level of abstraction for servicing a particular type of device, such as a mobile device 102 and the mobile apps 160 therein. The framework layer can provide a user interface server 250 to support human interaction with the various applications of the application layer via a map or location-based support subsystem interface 252, a user or people/communication-based support subsystem interface 254, a media support subsystem interface 256, and a vehicle subsystem interface 258. In one embodiment, the user interface server 250 at the framework layer can substantially mirror the functionality provided by the user interface server 220 at the application layer, except the user interface server 250 can be implemented in a smaller footprint (e.g., requires less memory and less processing power). As a result, the user interface server 250 may have less robust functionality or a reduced level of functionality with respect to subsystems of the user interface server 250 and corresponding subsystems of user interface server 220. However, the user interface server 250 can still provide support (albeit a reduced level of functionality) for vehicle and/or driver applications even when connection with the network cloud 205 is interrupted, intermittent, or temporarily lost. Thus, the framework layer is well-suited, though not exclusively suited, to a mobile environment where uninterrupted access to the network cloud 205 cannot always be assured. When access to the network cloud 205 is available, the full support of the vehicle and/or driver applications can be provided by the components of the application layer. When access to the network cloud 205 is not available or not reliable, a somewhat reduced level of support of the vehicle and/or driver applications can still be provided by the components of the framework layer without network cloud 205 connectivity. As shown in FIG. 2, the user interface server 250 can provide a user interface for the mobile apps executing on a mobile device 102. Because the user interface server 250 is in data communications with the components 118 of the vehicle 104 via the platform system 270 (described below), the user interface server 250 can provide any data or vehicle status signals needed by a mobile device app 106. Similarly, the user interface server 250 can communicate any control signals or configuration parameters from the mobile device app 106 to a corresponding component 118 via the platform system 270.

The platform layer represents a variety of components designed to reside on or with a platform system 270, which is typically installed on or in a vehicle, such as the vehicle 104 described above. As shown in FIG. 2, the platform system 270, of an example embodiment, can include a cloudcast subsystem 272, a carlink subsystem 274, a platform operating system 276, and a virtualization module 278. The platform operating system 276 can provide an execution environment for the platform system 270 components and interfaces to low-level hardware. The platform operating system 276 can execute platform apps 105 to process platform system 270 data and/or data captured from the ECUs of the vehicle. The virtualization module 278 can provide a logical abstraction or virtualization of the resources (hardware or software functional components) installed with or accessible to the platform system 270. The cloudcast subsystem 272 provides a variety of technologies and/or interfaces with which the platform system 270 can, for example, decode data and/or a media stream for presentation to vehicle occupants. A detail of cloudcast subsystem 272 in a particular embodiment is shown in FIG. 3.

Figure 3:
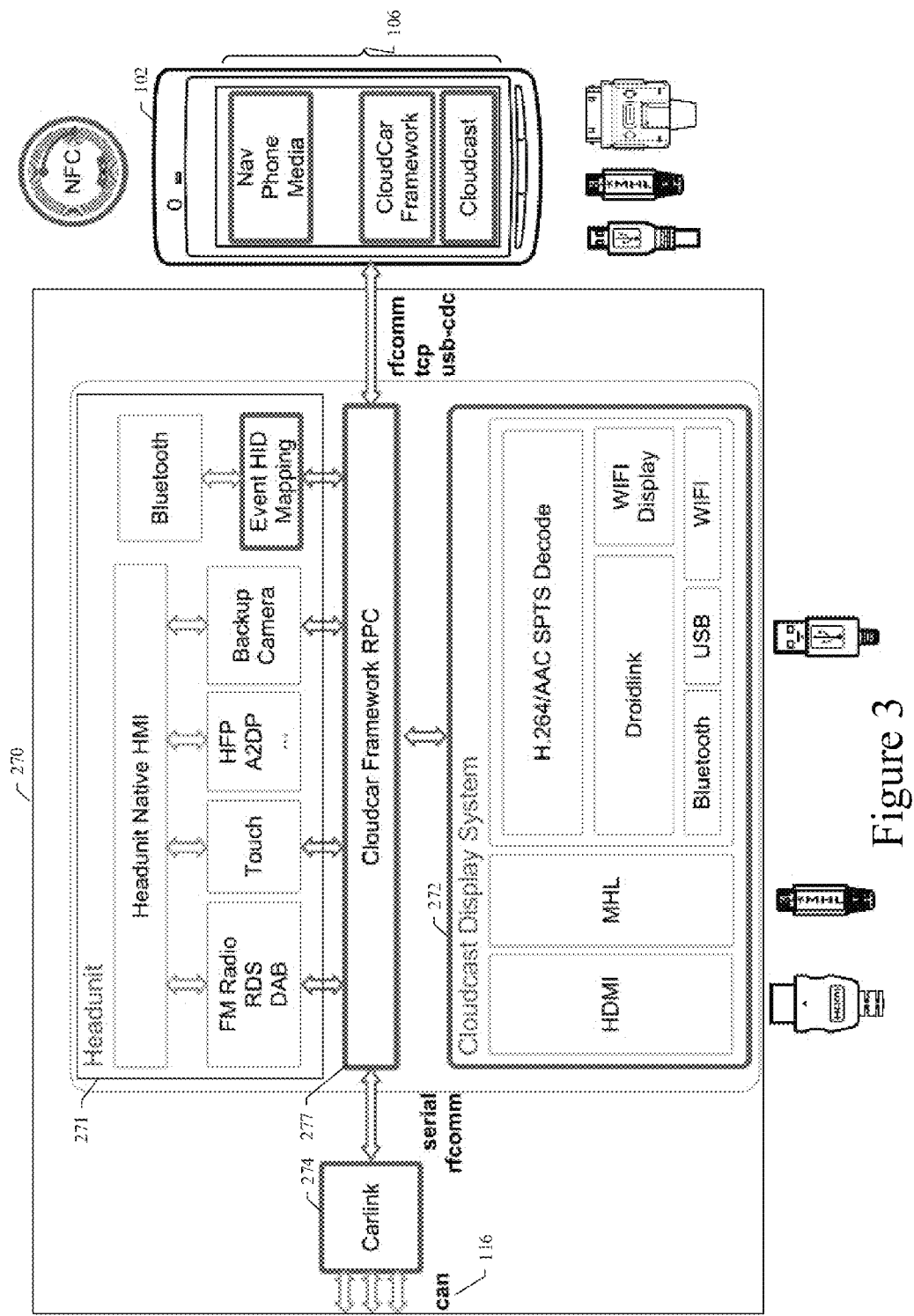
FIG. 3 illustrates a detail of the vehicle platform system in a particular embodiment.

As shown in FIG. 3, the cloudcast subsystem 272 of the platform system 270 can include an HDMI (High-Definition Multimedia Interface) module including a compact HDMI audio/video interface for transferring uncompressed digital audio/video data from an HDMI-compliant device ("the source") to a compatible digital audio and/or display device in the vehicle. The HDMI module can operate in concert with the media (e.g., audio or video) support subsystem 216 and related interfaces 226 and 256 to present high quality media to vehicle occupants. Similarly, the cloudcast subsystem 272 can include a Mobile High-definition Link (MHL) for connecting portable electronic devices (e.g., mobile devices) to the platform system 270. A variety of other modules or components provided in the cloudcast subsystem 272 can enable the transfer of data and media content to/from the platform system 270 in a variety of modes, protocols, and formats. In an example embodiment, these other modules provided in the cloudcast subsystem 272 can include a Bluetooth (a wireless technology standard for exchanging data over short distances) module, a USB (Universal Serial Bus) module, a WiFi (a popular technology allowing an electronic device to exchange data wirelessly over a computer network) module, a SPTS (Single Program Transport Stream) processing module, and a Droidlink module for communication with a particular type of mobile phone. It will be apparent to those of ordinary skill in the art that other modules or other groupings of modules can be provided in the cloudcast subsystem 272 to support particular types of mobile devices.

As also shown in FIG. 3, the platform system 270 can include a headunit subsystem 271, which includes a headunit native human machine interface (HMI) used to convey information and media content to an occupant of a vehicle. For example, the headunit native HMI can include devices or interfaces to devices, such as conventional plasma or liquid crystal display (LCD) monitors, heads-up display devices, projection devices, audio sound systems, and the like. Additionally, the headunit native HMI can include devices or interfaces to devices for receiving input from a user. For example, touch screens, buttons, softkeys, keyboards or key panels, voice command input systems and the like can be coupled with the headunit native HMI of the platform system 270. The map or geo-location-based support subsystem 212, user or people/communication-based support subsystem 214, media (e.g., audio or video) support subsystem 216, vehicle subsystem 218 and related interfaces 222-258 can receive input from occupants and render output for occupants using the various components of the headunit subsystem 271. It will be apparent to those of ordinary skill in the art that various HMI devices can be provided in the platform system 270 of a particular vehicle. As shown in FIG. 3, the headunit native HMI of headunit subsystem 271 can also receive data and media streams from a variety of devices or sources, including audio sources, FM radio sources, Radio Data System (RDS), Digital Audio Broadcasting (DAB), touch panel sources, Hands-Free Profile (HFP), A2DP, and video sources, such as a backup camera in a vehicle. RDS is a communications protocol standard for embedding small amounts of digital information in conventional FM radio broadcasts. Digital Audio Broadcasting, (DAB or DAB+) is a digital radio transmission standard. Hands-Free Profile (HFP) is a Bluetooth profile allowing hands-free kits to communicate with mobile phones in a car. The profile defines how high quality audio (stereo or mono) can be streamed from one device to another over a Bluetooth connection. For example, music can be streamed from a mobile phone to a wireless headset, hearing aid & cochlear implant streamer, car audio, or from a laptop/desktop to a wireless headset. A2DP can be used in conjunction with an intermediate Bluetooth transceiver that connects to a standard audio output jack, encodes the incoming audio to a Bluetooth-friendly format and sends the signal wirelessly to Bluetooth headphones that decode and play the audio. Bluetooth headphones, especially the more advanced models, often come with a microphone and support for the Headset (HSP), Hands-Free (HFP) and Audio/Video Remote Control (AVRCP) profiles. Conventional A2DP is designed to transfer a uni-directional 2-channel stereo audio stream, like music from an MP3 player, to a headset or car radio. Thus, in a variety of ways, the headunit native HMI of the headunit subsystem 271 can receive and render information and media content for an occupant of a vehicle. Similarly, in a variety of ways, the headunit native HMI of the headunit subsystem 271 can receive input and command selections from an occupant of a vehicle. As described above in connection with mapping platform 112, the platform system 270 can also include an event Human Interface Device (HID) mapper. The event HID mapper can map CAN messages to corresponding higher-level events. The higher-level events can trigger communications to other parts and other layers of the system, such as via a Bluetooth interface.

Referring still to FIG. 3, the platform system 270 can also include the carlink module 274. The carlink module 274, of an example embodiment, performs a function similar to the abstraction device 122 described above. In particular, the carlink module 274 may include one or more controllers that may be configured to receive one or more data signals from the CAN bus 116. In this manner, the carlink module 274 provides a link between the platform system 270 and the vehicle ECUs coupled to the CAN bus 116. The controller(s) in the carlink module 274 may then communicate the data signals to the cloudcast subsystem 272 and/or other subsystems of the platform system 270. In particular, low-level state changes occurring in vehicle components 118 can be mapped to corresponding higher-level events using the event HID mapper of the headunit subsystem 271 as described above.

As shown in FIG. 3, the data and service requests exchanged between the carlink module 274, the cloudcast subsystem 272, the headunit subsystem 271, and the mobile device 106 can be transferred using a Remote Procedure Call (RPC) framework 277. Similarly, as shown in FIG. 2, the data and service requests exchanged between the platform layer, the framework layer, and the application layer of the cloud-based vehicle information and control ecosystem 201 can be transferred using a low overhead RPC mechanism 280. The low overhead RPC mechanism 280 can also be used for transferring data and activating procedures between subsystems within each layer. The RPC framework 277 and the low overhead RPC mechanism 280 of an example embodiment provides a low overhead RPC mechanism configured to transfer data and service remote procedure requests in a more efficient manner than conventional RPC systems. Many of the state changes occurring in the vehicle components 118 can be represented in one or more data bits. The embodiments described herein provide a lower overhead RPC mechanism well-suited, though not exclusively suited, for applications, such as capturing data from and controlling actions of components 118 of a vehicle 104. The embodiments described herein provide a lower overhead RPC mechanism for performing remote procedure calls between subsystems using a reduced amount of data, thereby allowing secure and efficient RPC using minimal communications bandwidth. The details of the lower overhead RPC mechanism of an example embodiment are described in a related patent application titled, "Systems and Methods for Low Overhead Remote Procedure Calls" and filed by the same applicant as the present patent application.

Referring now to FIG. 4, a diagram presents an example of a set of events 300 that can be exposed within the cloud-based vehicle information and control ecosystem 201, wherein the events are determined to have an authentication level that grants access to higher-level events converted by the platform system 270, as opposed to having direct access to raw CAN messages. The set of events 300 depicted in FIG. 4 is just one example of the events that can be exposed within the cloud-based vehicle information and control ecosystem 201. In this example, the set of events 300 are read-only or are selected to have little or no risk of potential damage to the automobile or danger to occupants if the events 300 happen to be accessed by viruses or malware or are initiated by user error. The set of events 300 can be mapped from corresponding vehicle state change information as described above.

In some embodiments, only a subset of events 300 are exposed within the cloud-based vehicle information and control ecosystem 201 if, for example, certain subsystems or devices are determined to have a more restricted authentication level. In general, the set of events 300 are selected based on the authentication level of the subsystem or device, the ECUs present in a particular vehicle make and model, and the intended purpose and functionality of the subsystems or devices that are to be used within the cloud-based vehicle information and control ecosystem 201 as described herein.

Figure 5:
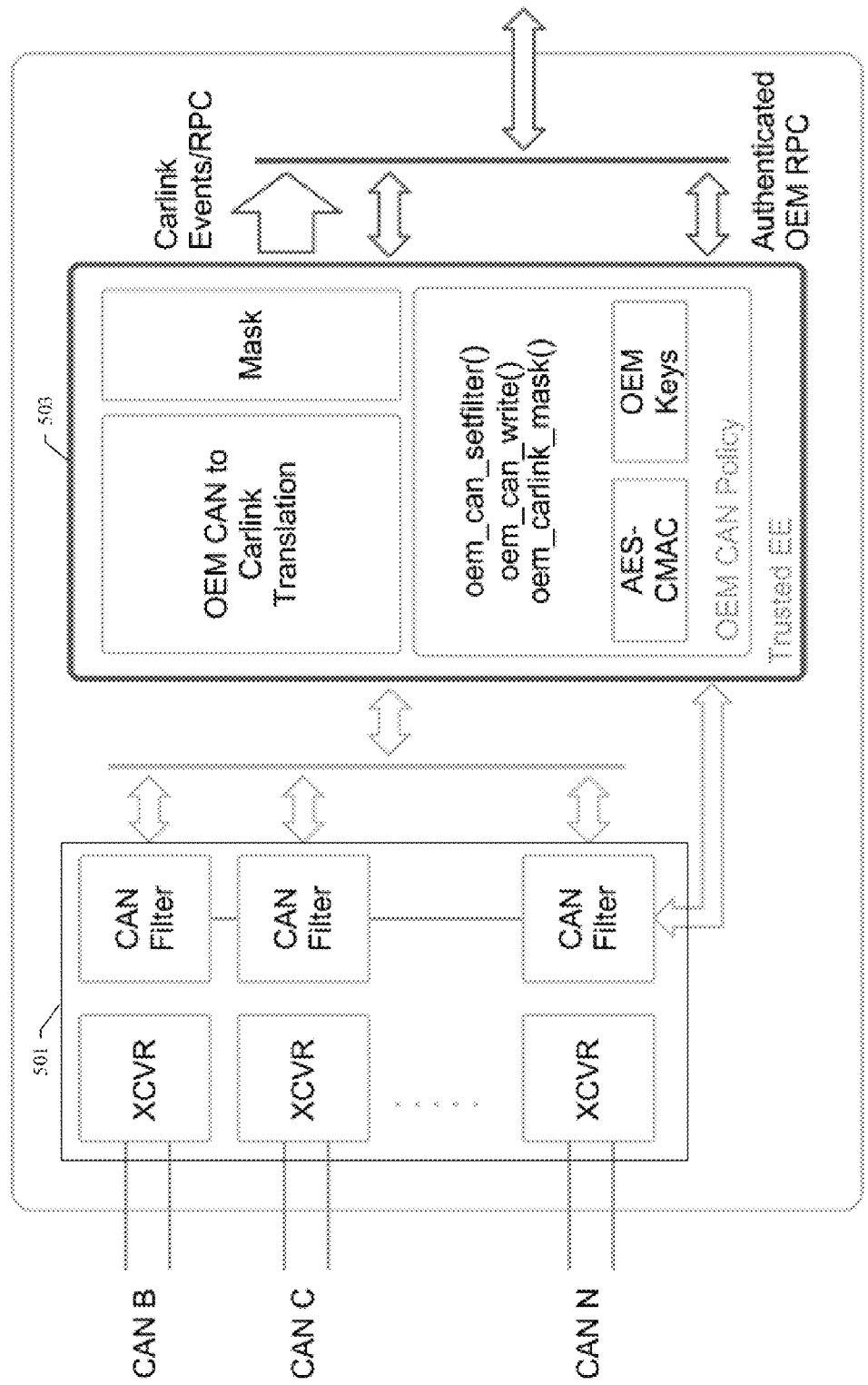
FIG. 5 illustrates an example embodiment of a mechanism for communicating a translation of raw Controller Area Network (CAN) data to corresponding events that can be passed up and processed by higher abstraction layers of a cloud-based vehicle information and control ecosystem.

Referring now to FIG. 5, an example illustrates a mechanism for communicating a translation of raw CAN data to corresponding events that can be passed up and processed by higher abstraction layers of the cloud-based vehicle information and control ecosystem 201. As described above, the platform system 270 of an example embodiment provides a mechanism configured to transfer data and service remote method or procedure requests at higher abstraction layers of the cloud-based vehicle information and control ecosystem 201. State changes occurring in the vehicle components 118 (shown in FIG. 1) can be transferred to a corresponding signal transceiver of CAN transceiver unit 501 shown in FIG. 5. These vehicle state changes can be represented in one or more data bits. In the example embodiment shown in FIG. 5, the vehicle state changes can be transferred from the CAN transceiver unit 501 to event translator 503 via an internal bus. The event translator 503 can be configured to pack the vehicle state change information into the smallest unit of data needed to preserve the vehicle state change information. The event translator 503 can be configured to select the best of several available modes for communicating the vehicle state change information to higher-level processes of the cloud-based vehicle information and control ecosystem 201.

FIG. 6 illustrates an example of the data structures and methods or procedures used to service various events mapped from vehicle state change information passed to the subsystems of the cloud-based vehicle information and control ecosystem 201 as described above. As shown in the example of FIG. 6, a radio in a vehicle can have a variety of events and actions associated therewith. Using the mechanisms described herein, these events and actions can be conveyed to and serviced by the various layers and subsystems of the cloud-based vehicle information and control ecosystem 201 as described herein. As a result, an efficient, scalable, modular, and layered cloud-based system can be implemented.

Figure 7:
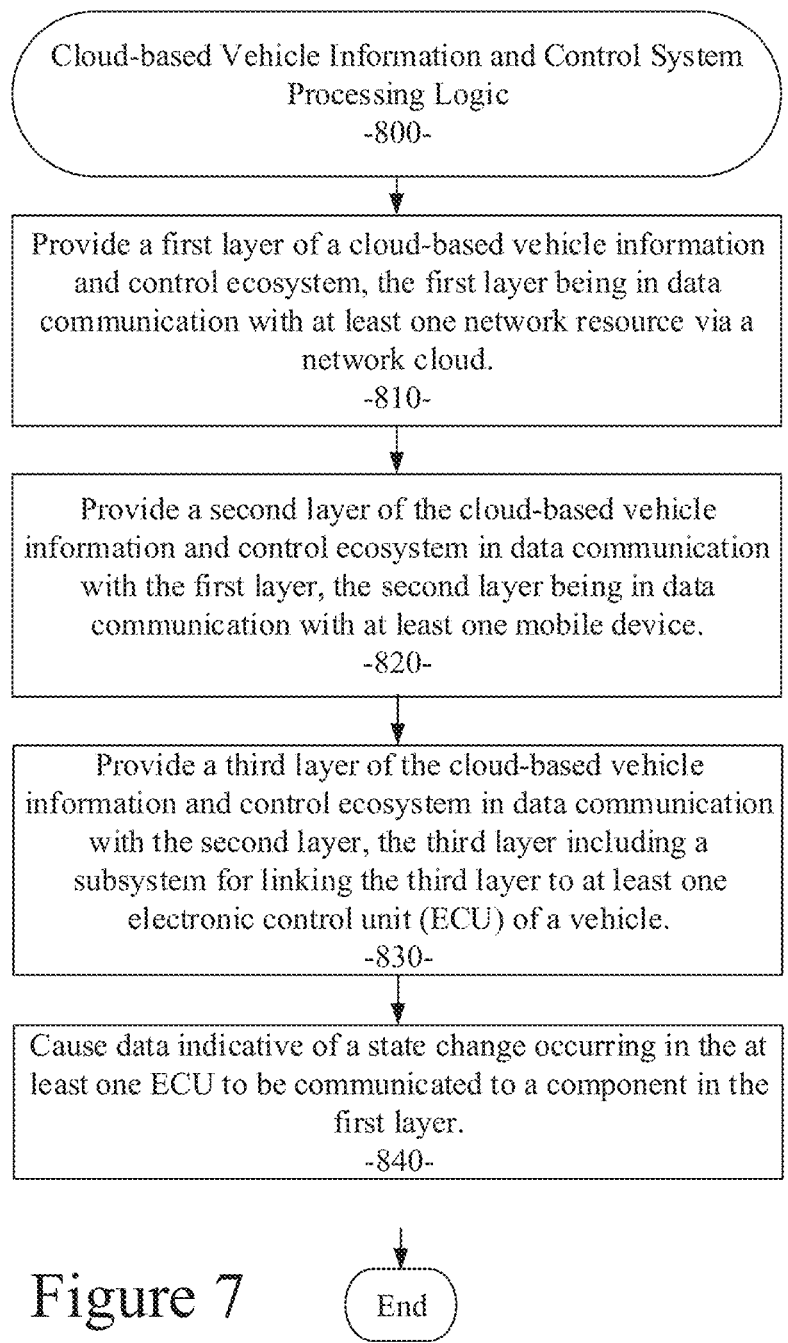
FIG. 7 is a processing flow chart illustrating an example embodiment of systems and methods for providing a cloud-based vehicle information and control ecosystem.

FIG. 7 is a processing flow diagram illustrating an example embodiment of systems and methods for providing a cloud-based vehicle information and control ecosystem as described herein. The method of an example embodiment includes: providing a first layer of a cloud-based vehicle information and control ecosystem, the first layer being in data communication with at least one network resource via a network cloud (processing block 810); providing a second layer of the cloud-based vehicle information and control ecosystem in data communication with the first layer, the second layer being in data communication with at least one mobile device (processing block 820); providing a third layer of the cloud-based vehicle information and control ecosystem in data communication with the second layer, the third layer including a subsystem for linking the third layer to at least one electronic control unit (ECU) of a vehicle (processing block 830); and causing, by use of a data processor, data indicative of a state change occurring in the at least one ECU to be communicated to a component in the first layer (processing block 840).

Figure 8:
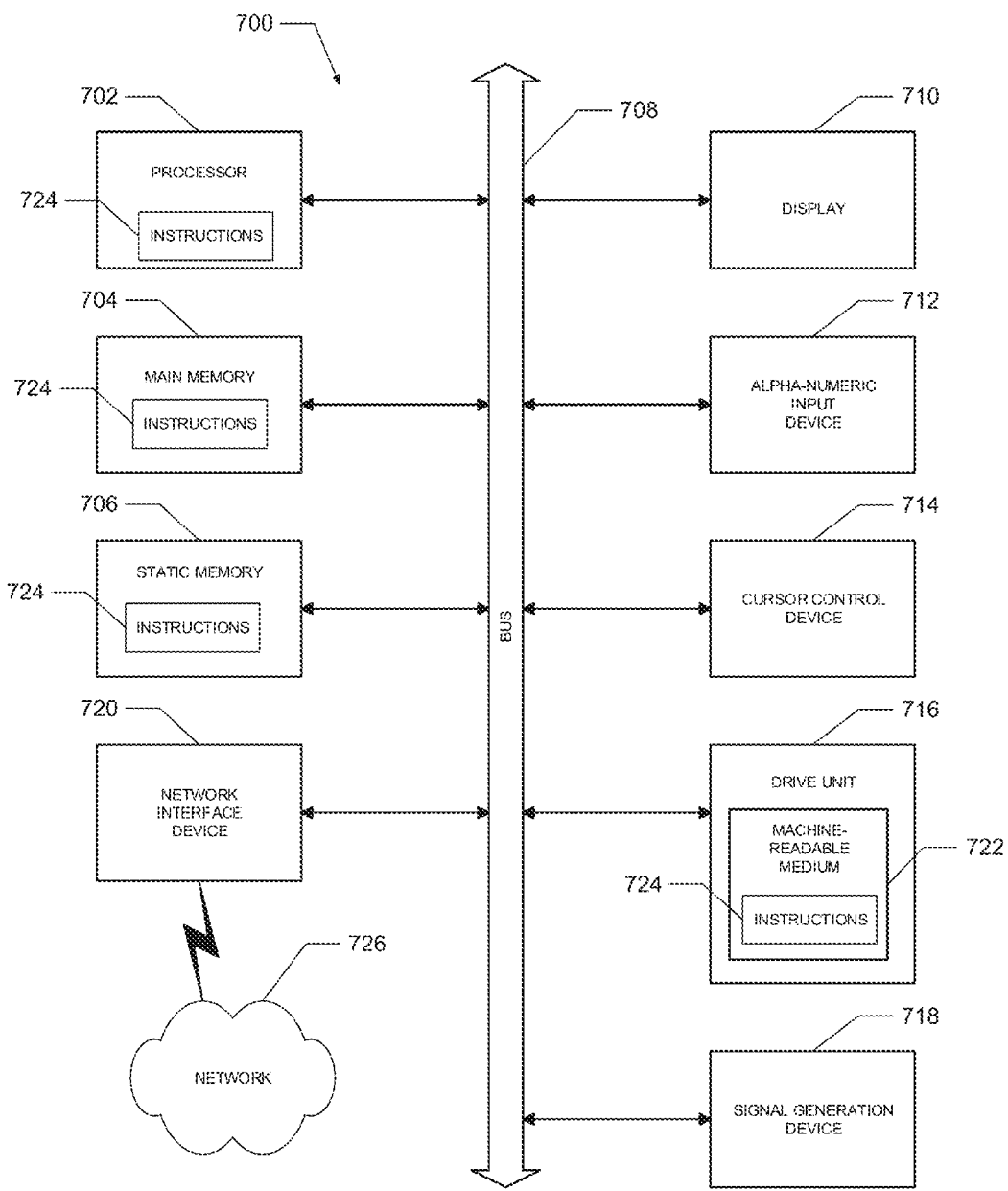
FIG. 8 shows a diagrammatic representation of machine in the example form of a computer system within which a set of instructions when executed may cause the machine to perform any one or more of the methodologies discussed herein.

FIG. 8 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
providing a first layer of a cloud-based vehicle information and control ecosystem, the first layer being in data communication with at least one network resource via a network cloud;
providing a second layer of the cloud-based vehicle information and control ecosystem in data communication with the first layer, the second layer being in data communication with at least one mobile device;
providing a third layer of the cloud-based vehicle information and control ecosystem in data communication with the second layer, the third layer including a subsystem for linking the third layer to at least one electronic control unit (ECU) of a vehicle;
receiving, by use of a data processor, control data indicative of a state change to modify the state of one or more components of the vehicle, the control data being received from a component in the first or second layer;
converting the control data indicative of a state change from a first or second layer device format defined by an Application Programming Interface (API) to a vehicle-specific format; and
using the control data to modify the state of the one or more components of the vehicle.

2. The method of claim 1 including providing a vehicle information and control system in the first layer to transfer the control data indicative of the state change.

3. The method of claim 1 wherein the control data indicative of a state change is received from the at least one mobile device.

4. The method of claim 1 wherein at least one subsystem in the second layer providing an interface to a mobile app on the at least one mobile device, the control data indicative of a state change being received from the mobile app on the at least one mobile device.

5. The method of claim 1 wherein the control data indicative of a state change is received from the at least one network resource via the network cloud.

6. The method of claim 1 wherein at least one subsystem in the first layer providing an interface to a web app on the at least one network resource, the control data indicative of a state change being received from the web app on the at least one network resource.

7. The method of claim 1 wherein at least one subsystem in the second layer substantially mirroring the functionality of a corresponding subsystem in the first layer.

8. The method of claim 1 wherein at least one subsystem in the second layer providing a reduced level of functionality of a corresponding subsystem in the first layer if communication with the network cloud is interrupted.

9. The method of claim 1 wherein at least one subsystem in the second layer providing an interface to a mobile app on the at least one mobile device.

10. A system comprising:
one or more data processors; and
a cloud-based vehicle information and control ecosystem, executable by the one or more data processors, to:
provide a first layer of a cloud-based vehicle information and control ecosystem, the first layer being in data communication with at least one network resource via a network cloud;
provide a second layer of the cloud-based vehicle information and control ecosystem in data communication with the first layer, the second layer being in data communication with at least one mobile device;
provide a third layer of the cloud-based vehicle information and control ecosystem in data communication with the second layer, the third layer including a subsystem for linking the third layer to at least one electronic control unit (ECU) of a vehicle;
receive control data indicative of a state change to modify the state of one or more components of the vehicle, the control data being received from a component in the first or second layer;
convert the control data indicative of a state change from a first or second layer device format defined by an Application Programming Interface (API) to a vehicle-specific format; and
use the control data to modify the state of the one or more components of the vehicle.

11. The system of claim 10 being further configured to provide a vehicle information and control system in the first layer to transfer the data indicative of the state change.

12. The system of claim 10 wherein the control data indicative of a state change is received from the at least one mobile device.

13. The system of claim 10 wherein at least one subsystem in the second layer providing an interface to a mobile app on the at least one mobile device, the control data indicative of a state change being received from the mobile app on the at least one mobile device.

14. The system of claim 10 wherein the control data indicative of a state change is received from the at least one network resource via the network cloud.

15. The system of claim 10 wherein at least one subsystem in the first layer providing an interface to a web app on the at least one network resource, the control data indicative of a state change being received from the web app on the at least one network resource.

16. The system of claim 10 wherein at least one subsystem in the second layer substantially mirroring the functionality of a corresponding subsystem in the first layer.

17. The system of claim 10 wherein at least one subsystem in the second layer providing a reduced level of functionality of a corresponding subsystem in the first layer if communication with the network cloud is interrupted.

18. The system of claim 10 wherein at least one subsystem in the second layer providing an interface to a mobile app on the at least one mobile device.

19. A non-transitory machine-useable storage medium embodying instructions which, when executed by a machine, cause the machine to:
provide a first layer of a cloud-based vehicle information and control ecosystem, the first layer being in data communication with at least one network resource via a network cloud;
provide a second layer of the cloud-based vehicle information and control ecosystem in data communication with the first layer, the second layer being in data communication with at least one mobile device;
provide a third layer of the cloud-based vehicle information and control ecosystem in data communication with the second layer, the third layer including a subsystem for linking the third layer to at least one electronic control unit (ECU) of a vehicle;

receive control data indicative of a state change to modify the state of one or more components of the vehicle, the control data being received from a component in the first or second layer;

convert the control data indicative of a state change from a first or second layer device format defined by an Application Programming Interface (API) to a vehicle-specific format; and use the control data to modify the state of the one or more components of the vehicle.

20. The machine-useable storage medium of claim 19 being further configured to provide a vehicle information and control system in the first layer to transfer the data indicative of the state change.

* * * * *